United States Patent
Teng et al.

(10) Patent No.: US 11,930,199 B2
(45) Date of Patent: *Mar. 12, 2024

(54) MOTION STORING PROCESS FOR PARTITION PREDICTION MODE

(71) Applicant: FG Innovation Company Limited, Tuen Mun (HK)

(72) Inventors: Chih-Yu Teng, Taipei (TW); Yu-Chiao Yang, Taipei (TW); Po-Han Lin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,405

(22) Filed: Jan. 24, 2022

(65) Prior Publication Data

US 2022/0150520 A1   May 12, 2022

Related U.S. Application Data

(63) Continuation of application No. 16/906,358, filed on Jun. 19, 2020, now Pat. No. 11,272,199.
(Continued)

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/119* (2014.11); *H04N 19/176* (2014.11); *H04N 19/46* (2014.11)

(58) Field of Classification Search
None
See application file for complete search history.

(56) References Cited

U.S. PATENT DOCUMENTS

2016/0366435 A1   12/2016   Chien et al.
2018/0070110 A1*   3/2018   Chuang ................ H04N 19/463
(Continued)

FOREIGN PATENT DOCUMENTS

JP   2018522468 A   8/2018

OTHER PUBLICATIONS

Benjamin Bross et al., "Versatile Video Coding (Draft 3)", Joint Video Experts Team (JVET) of ITU-T SG 16 WP 3 and ISO/IEC JTC 1/ SC 29/WG 11 12th Meeting: Macao, CN, Oct. 3-12, 2018, JVET-M0352, p. 119, Paragraph 8.3.3.4-p. 120, Paragraph 8.3.3.6, p. 112, Paragraph 8.3.3.1-p. 114, Paragraph 8.3.3.2, p. 94, Paragraph 8.3.2.2-p. 95.
(Continued)

*Primary Examiner* — Chikaodili E Anyikire
(74) *Attorney, Agent, or Firm* — ScienBiziP, P.C.

(57) ABSTRACT

A method of decoding a bitstream by an electronic device is provided. The method determines a block unit from an image frame received from the bitstream. To reconstruct the block unit, the method receives, from a candidate list, first motion information having a first list flag for selecting a first reference frame and second motion information having a second list flag for selecting a second reference frame. The method then stores a predefined one of the first and second motion information for a sub-block determined in the block unit when the first list flag is identical to the second list flag.

11 Claims, 8 Drawing Sheets

Related U.S. Application Data

(60) Provisional application No. 62/884,335, filed on Aug. 8, 2019, provisional application No. 62/865,443, filed on Jun. 24, 2019.

(51) Int. Cl.
    *H04N 19/119* (2014.01)
    *H04N 19/176* (2014.01)
    *H04N 19/46* (2014.01)

(56) References Cited

U.S. PATENT DOCUMENTS

| | | | |
|---|---|---|---|
| 2020/0186799 A1* | 6/2020 | Wang | H04N 19/52 |
| 2020/0213622 A1* | 7/2020 | Xu | H04N 19/52 |

OTHER PUBLICATIONS

Jingya Li et al., "CE4: Triangle merge candidate list simplification (Test 4.4.7)", Joint Video Experts Team (JVET) of ITU-T SG 16 WP 3 and ISO/IEC JTC 1/SC 29/WG 11 14th Meeting: Geneva, CH, Mar. 19-27, 2019, JVET-N0197-V1, p. 7-p. 9.

Hahyun Lee et al., "Non-CE4: Simplification of motion vector storage process for triangle merge mode", Joint Video Experts Team (JVET) of ITU-T SG 16 WP 3 and ISO/IEC JTC 1/SC 29/WG 11 15th Meeting: Gothenburg, SE, Jul. 3-12, 2019, JVET-O0329, p. 1-p. 3.

Jianle Chen et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11, JVET-N1002-V2, Jun. 11, 2019, pp. 45-47.

\* cited by examiner

| 561 | 562 | 563 | 564 |
| 565 | 566 | 567 | 568 |
| 569 | 570 | 571 | 572 |
| 573 | 574 | 575 | 576 |
FIG. 5A
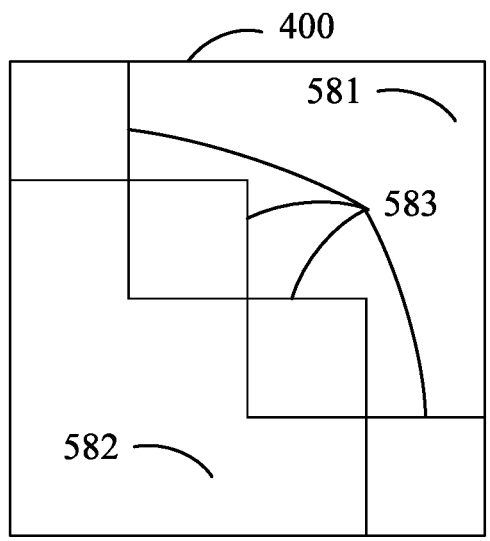
FIG. 5B
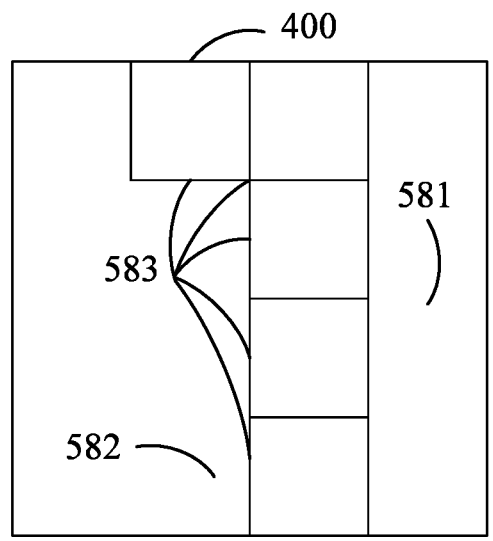
FIG. 5C

MOTION STORING PROCESS FOR PARTITION PREDICTION MODE

CROSS-REFERENCE TO RELATED APPLICATION(S)

This application is a continuation application of U.S. patent application Ser. No. 16/906,358, filed on Jun. 19, 2020 ("the '358 application"), which claims the benefit of and priority to U.S. Provisional Patent Application Ser. No. 62/865,443, filed on Jun. 24, 2019, entitled "Motion Storing Process for Triangle Partition Prediction and Reference Sampling Process for Linear Model" (hereinafter referred to as "'443 provisional") and U.S. Provisional Patent Application Ser. No. 62/884,335, filed on Aug. 8, 2019, entitled "High Level Syntax of Affine Related Mode and Sample Selection of Linear Model" (hereinafter referred to as "'335 provisional"). The disclosure of the '358 application, the '443 provisional and the '335 provisional are hereby incorporated fully by reference into the present disclosure.

FIELD

The present disclosure generally relates to video coding, and more particularly, to techniques for storing motion information of a block unit in an image frame to predict a plurality of following blocks.

BACKGROUND

Triangle partitioning mode and geometric partitioning mode are coding tools in a video coding method. In the triangle partitioning mode and geometric partitioning mode, the encoder may select two of a plurality of merge candidates for predicting the block unit and provide two merge indices into a bitstream for the decoder to recognize the selected merge candidates.

An encoder and a decoder may split a block unit in an image frame to generate a plurality of sub-blocks, and store at least one of the two merge candidates for each of the sub-blocks in their buffer to predict a plurality of following blocks. However, in the triangle partitioning mode and geometric partitioning mode, some of a plurality of block components in the block unit may be predicted based on only one of the two merge candidates, and the others may be predicted based on both of the two merge candidates. If the two merge candidates are stored for each of the sub-blocks predicted based on both of the two merge candidates, the stored motion candidates may be too complex for the following prediction.

SUMMARY

The present disclosure is directed to a device and method for storing motion information of a block unit in an image frame to predict a plurality of following blocks.

In a first aspect of the present disclosure, a method for decoding a bitstream and an electronic device for performing the method are provided. The method comprises receiving an image frame of the bitstream; determining a block unit from the received image frame; receiving first motion information and second motion information from a candidate list to reconstruct the block unit, wherein the first motion information includes a first list flag for selecting a first reference frame and the second motion information includes a second list flag for selecting a second reference frame; determining a sub-block in the block unit; comparing the first list flag with the second list flag; and storing a predefined one of the first motion information and the second motion information as a stored motion information for the sub-block when the first list flag is identical to the second list flag.

An implementation of the first aspect further comprises determining a split line of the block unit; and determining whether the sub-block is included in a specific one of a plurality of block regions separated based on the split line, wherein: the specific one of the plurality of block regions covers the split line, and the first list flag is compared with the second list flag when the sub-block is included in the specific one of the plurality of block regions.

Another implementation of the first aspect further comprises storing the first motion information as the stored motion information for the sub-block when the sub-block is included in a first one of the plurality of block regions corresponding to the first motion information; storing the second motion information as the stored motion information for the sub-block when the sub-block is included in a second one of the plurality of block regions corresponding to the second motion information; and reconstructing a following block based on the stored motion information when the following block is being reconstructed based on the sub-block, wherein each of the first one of the plurality of block regions and the second one of the plurality of block regions is different from the specific one of the plurality of block regions.

Another implementation of the first aspect further comprises storing the predefined one of the first motion information and the second motion information as the stored motion information for the sub-block when the first list flag is identical to the second list flag and the sub-block is included in the specific one of the plurality of block regions; storing the first motion information and the second motion information together as the stored motion information for the sub-block when the first list flag is different from the second list flag and the sub-block is included in the specific one of the plurality of block regions; and reconstructing a following block based on the stored motion information when the following block is being reconstructed based on the sub-block.

In another implementation of the first aspect, the predefined one of the first motion information and the second motion information is stored as the stored motion information for the sub-block without checking whether the first reference frame and the second reference frame are included in a specific one of a plurality of reference lists indicated by a specific one of a plurality of flag values different from the first list flag and the second list flag when the first list flag is identical to the second list flag.

In another implementation of the first aspect, the predefined one of the first motion information and the second motion information is the second motion information.

In another implementation of the first aspect, the predefined one of the first motion information and the second motion information is stored as the stored motion information for the sub-block without checking whether the first reference frame and the second reference frame are included in a specific one of a plurality of reference lists indicated by a specific one of a plurality of flag values different from the first list flag and the second list flag when the first list flag is identical to the second list flag; and the specific one of the plurality of reference lists indicated by the specific one of the plurality of flag values is different from another one of the plurality of reference lists indicated by the first list flag when a number of the plurality of reference lists is equal to two and the first list flag is identical to the second list flag.

In a second aspect of the present disclosure, a method for decoding a bitstream and an electronic device for performing the method are provided. The method comprises receiving an image frame of the bitstream; determining a block unit from the received image frame; determining a split line of the block unit; receiving first motion information and second motion information from a candidate list to reconstruct the block unit, wherein the first motion information includes a first list flag and the second motion information includes a second list flag; determining a sub-block in the block unit; determining whether the sub-block is included in a specific one of a plurality of block regions separated based on the split line, wherein the specific one of the plurality of block regions covers the split line; determining, based only on a comparison between the first list flag and the second list flag, whether the first motion information and the second motion information are stored together as the stored motion information for the sub-block, when the sub-block is included in the specific one of the plurality of block regions; and reconstructing a following block based on the stored motion information.

Another implementation of the second aspect further comprises storing the first motion information as the stored motion information for the sub-block when the sub-block is included in a first one of the plurality of block regions corresponding to the first motion information; and storing the second motion information as the stored motion information for the sub-block when the sub-block is included in a second one of the plurality of block regions corresponding to the second motion information, wherein each of the first one of the plurality of block regions and the second one of the plurality of block regions is different from the specific one of the plurality of block regions.

Another implementation of the second aspect further comprises storing the second motion information as the stored motion information for the sub-block when the first list flag is equal to the second list flag and the sub-block is included in the specific one of the plurality of block regions.

Another implementation of the second aspect further comprises reconstructing the following block based on the stored motion information when the following block is being reconstructed based on the sub-block, wherein the block unit is reconstructed prior to reconstructing the following block.

Another implementation of the second aspect further comprises storing the first motion information and the second motion information together as the stored motion information for the sub-block when the first list flag is different from the second list flag.

In another implementation of the second aspect, a predefined one of the first motion information and the second motion information is stored as the stored motion information for the sub-block without checking whether a first reference frame selected based on the first list flag and a second reference frame selected based on the second list flag are included in a specific one of a plurality of reference lists indicated by a specific one of a plurality of flag values different from the first list flag when the first list flag is equal to the second list flag.

BRIEF DESCRIPTION OF THE DRAWINGS

Aspects of the disclosure are best understood from the following detailed description when read with the accompanying figures. Various features are not drawn to scale and dimensions of various features may be arbitrarily increased or reduced for clarity of discussion.

FIGS. 5A-5C are schematic illustrations of a block unit having a plurality of sub-blocks categorized into different block regions, according to example implementations of the present application.

DETAILED DESCRIPTION

Figure 1:
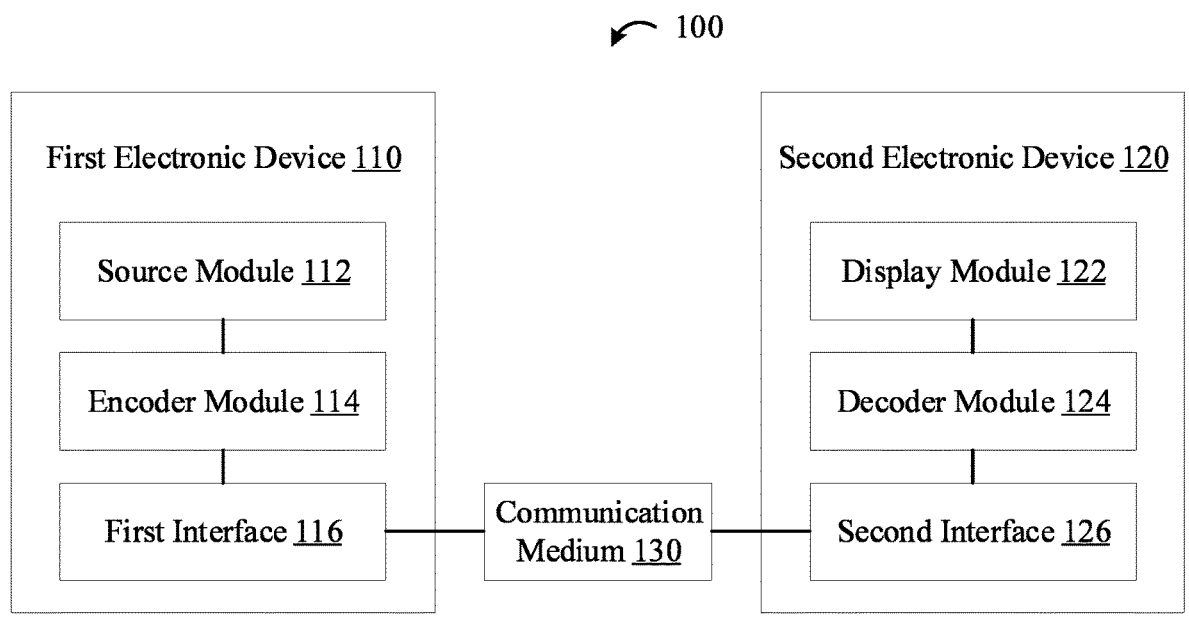
FIG. 1 illustrates a block diagram of an example system configured to encode and decode video data according to an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art.

Unless noted otherwise, like or corresponding elements among the figures may be indicated by like or corresponding reference numerals. The drawings and illustrations in the present disclosure are generally not to scale and are not intended to correspond to actual relative dimensions.

For the purpose of consistency and ease of understanding, like features are identified (although, in some examples, not shown) by numerals in the exemplary figures. However, the features in different implementations may differ in other respects and shall not be narrowly confined to what is shown in the figures.

The description uses the phrases "in one implementation," or "in some implementations," may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series and the equivalent.

For purposes of explanation and non-limitation, specific details such as functional entities, techniques, protocols, and standards are set forth for providing an understanding of the disclosed technology. In other examples, detailed description of well-known methods, technologies, systems and architectures are omitted so as not to obscure the description with unnecessary details.

Persons skilled in the art will immediately recognize that any disclosed coding function(s) or algorithm(s) described in the present disclosure may be implemented by hardware, software or a combination of software and hardware. Described functions may correspond to modules may be software, hardware, firmware, or any combination thereof.

A software implementation may include computer executable instructions stored on computer readable medium such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuitry (ASIC), programmable logic arrays, and/or using one or more digital signal processors (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an example implementation of the present disclosure. The system 100 includes a first electronic device 110, a second electronic device 120, and a communication medium 130. The first electronic device 110 may be a source device including any device configured to encode video data and transmit encoded video data to the communication medium 130. The second electronic device 120 may be a destination device including any device configured to receive encoded video data via the communication medium 130 and to decode encoded video data.

In at least one implementation, the first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

In at least one implementation, the first electronic device 110 and/or the second electronic device 120 may be a mobile phone, a tablet, a desktop, a notebook, or other electronic devices. FIG. 1 merely illustrates one example of the first electronic device 110 and the second electronic device 120. The first electronic device 110 and second electronic device 120 in other implementations may include more or less components than illustrated or have a different configuration of the various components.

In at least one implementation, the source module 112 may include a video capture device to capture a new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

In at least one implementation, the encoder module 114 and the decoder module 124 may each be implemented as any of a variety of suitable encoder/decoder circuitry such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When implemented partially in software, a device may store instructions for the software in a suitable, non-transitory computer-readable medium and execute the instructions in hardware using one or more processors to perform the disclosed methods. In at least one implementation, each of the encoder module 114 and the decoder module 124 may be included in one or more encoders or decoders, any of which may be integrated as part of a combined encoder/decoder (CODEC) in a device.

In at least one implementation, the first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 116 and the second interface 126 may each include any device configured to transmit and/or store a compliant video bitstream via the communication medium 130 and to receive the compliant video bitstream via the communication medium 130.

In at least one implementation, the first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 122 may include a display using liquid crystal display (LCD) technology, plasma display technology, organic light emitting diode (OLED) display technology, or light emitting polymer display (LPD) technology with other display technologies used in other implementations. The display module 122 may include a high-definition display or an ultra high-definition display.

Figure 2:
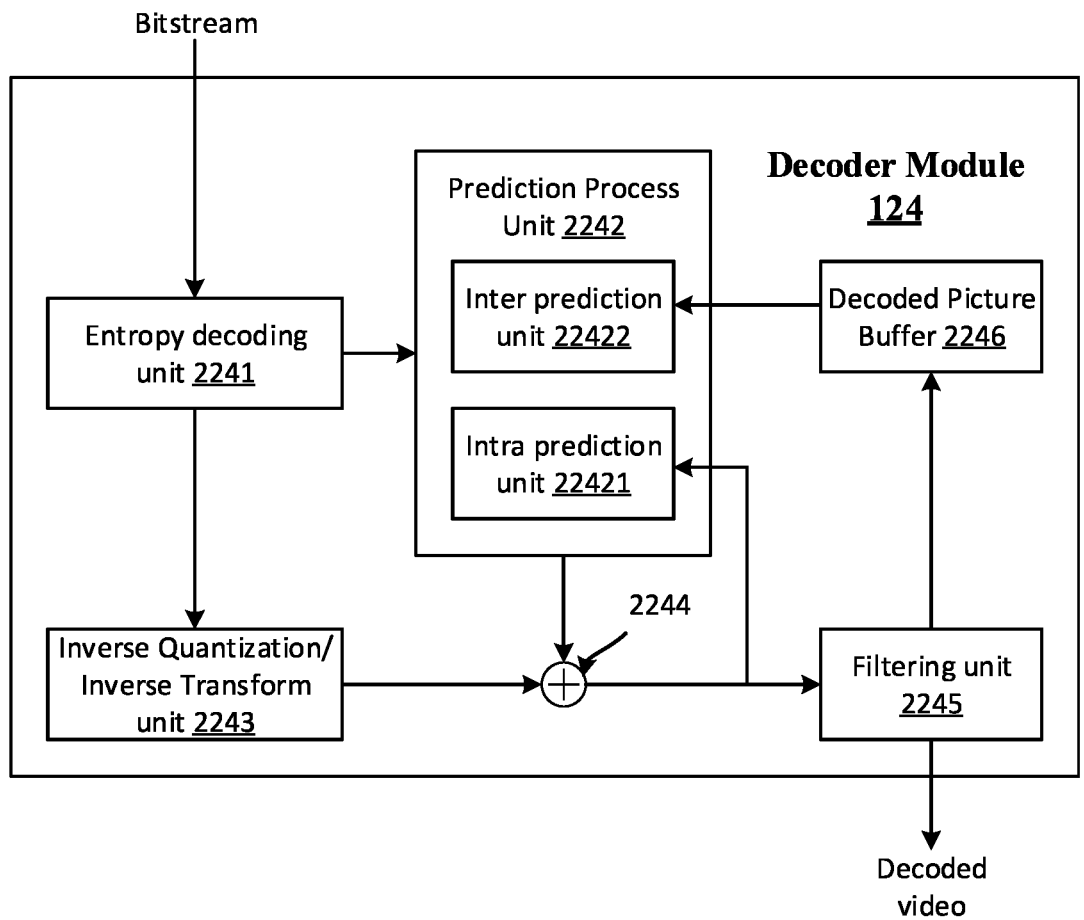
FIG. 2 illustrates a block diagram of an example decoder module of the second electronic device in FIG. 1 according to an example implementation of the present application.

FIG. 2 illustrates a block diagram representing an implementation of the decoder module 124 of the second electronic device 120 in FIG. 1, according to an example implementation of the present application. The decoder module 124 includes an entropy decoder (e.g., an entropy decoding unit 2241), a prediction processor (e.g., a prediction process unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction process unit 2242 further includes an intra prediction processor (e.g., an intra prediction unit 22421) and an inter prediction processor (e.g., an inter prediction unit 22422).

The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

In at least one implementation, the entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

In at least one implementation, the prediction process unit 2242 may receive syntax elements such as motion vectors, intra modes, partition information, and other syntax information from the entropy decoding unit 2241. The prediction process unit 2242 may receive the syntax elements including the partition information and divide image frames according to the partition information.

In at least one implementation, each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2242 receives predicted data including the intra mode or the motion vector for a current image block of a specific one of the image frames. The current image block may be the luminance block or one of the chrominance blocks in the specific image frame.

In at least one implementation, the intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. In at least one implementation, the intra prediction unit 22421 may reconstruct a plurality of chroma components of the current block unit based on a plurality of luma components of the current block unit when the chroma components are reconstructed by the prediction process unit 2242.

In at least one implementation, the intra prediction unit 22421 may reconstruct a plurality of chroma components of the current block unit based on the plurality of luma components of the current block unit when the luma components of the current block are reconstructed by the prediction process unit 2242.

In at least one implementation, the inter prediction unit 22422 may perform inter-predictive coding of the current block unit relative to one or more blocks in one or more reference image blocks based on syntax elements related to the motion vector in order to generate the predicted block.

In at least one implementation, the motion vector may indicate a displacement of the current block unit within the current image block relative to a reference block unit within the reference image block. The reference block unit is a block determined to closely match the current block unit.

In at least one implementation, the inter prediction unit 22422 receives the reference image block stored in the decoded picture buffer 2246 and reconstructs the current block unit based on the received reference image blocks.

In at least one implementation, the inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

In at least one implementation, the inverse transformation may be inversely applied by the transformation process such as discrete cosine transform (DCT), discrete sine transform (DST), adaptive multiple transform (AMT), mode-dependent non-separable secondary transform (MDNSST), hypercube-givens transform (HyGT), signal dependent transform, Karhunen-Loéve transform (KLT), wavelet transform, integer transform, sub-band transform or a conceptually similar transform.

In at least one implementation, the inverse transformation may convert the residual information from a transform domain, such as a frequency domain, back to the pixel domain. In at least one implementation, the degree of inverse quantization may be modified by adjusting a quantization parameter. The summer 2244 adds the residual block to the predicted block from the prediction process unit 2242 to produce a reconstructed block.

In at least one implementation, the summer 2244 adds the reconstructed residual block to the predicted block provided from the prediction process unit 2242 to produce a reconstructed block.

In at least one implementation, the filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF. Such filters are not explicitly shown for brevity but may filter the output of the summer 2244.

The filtering unit 2245 may output the decoded video to the display module 122 or other video receiving unit after the filtering unit 2245 performs the filtering process for the reconstructed blocks of the specific image frame.

In at least one implementation, the decoded picture buffer 2246 may be a reference picture memory that stores the reference block for use by the prediction process unit 2242 in decoding the bitstream (in inter coding modes). The decoded picture buffer 2246 may be formed by any of a variety of memory devices such as dynamic random-access memory (DRAM), including synchronous DRAM (SDRAM), magneto-resistive RAM (MRAM), resistive RAM (RRAM), or other types of memory devices.

In at least one implementation, the decoded picture buffer 2246 may be on-chip with other components of the decoder module 124 or off-chip relative to those components.

Figure 3:
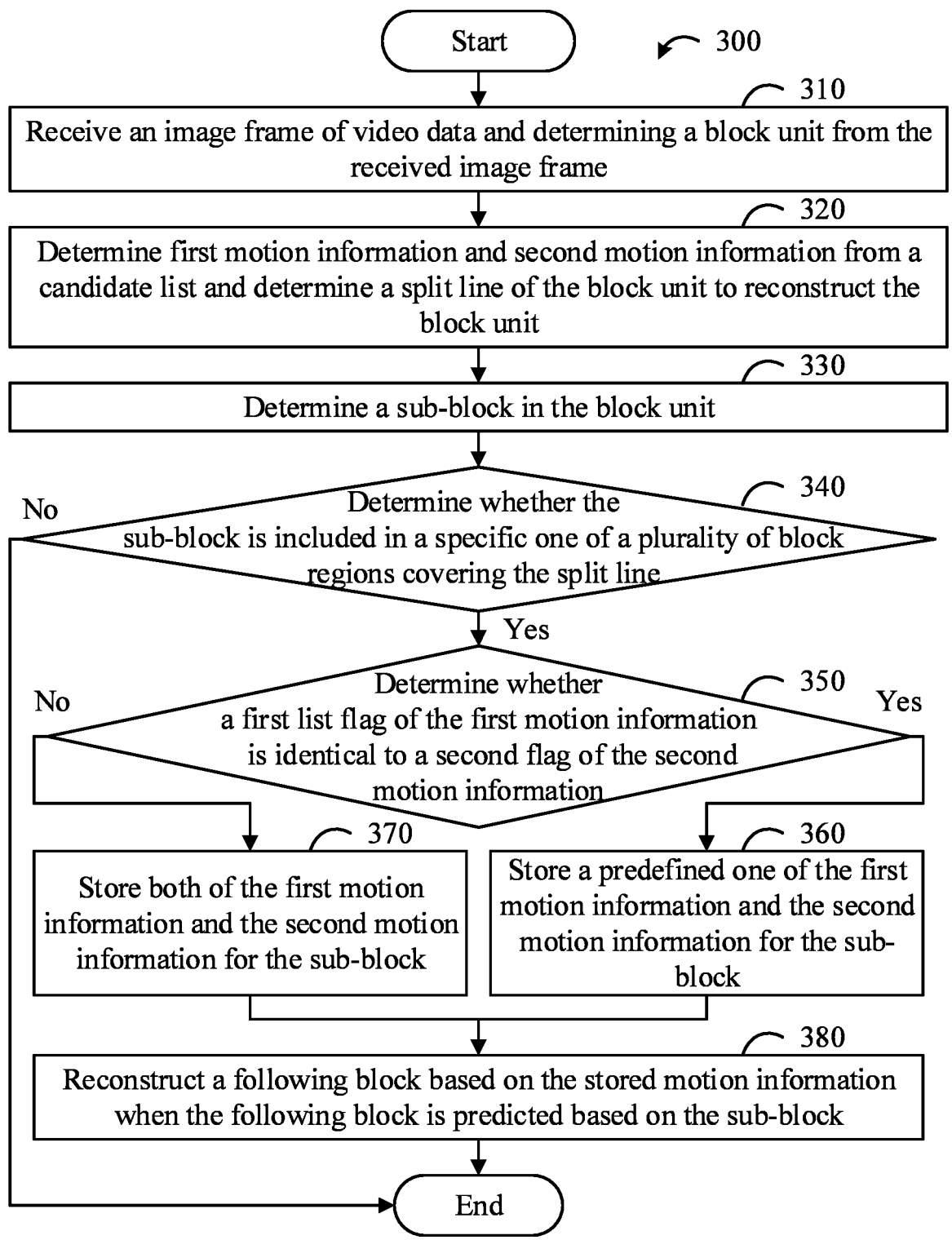
FIG. 3 illustrates a flowchart of an example reconstruction method for reconstructing a block unit according to an example implementation of the present disclosure.

FIG. 3 illustrates a flowchart of an example reconstruction method 300 for reconstructing a block unit according to an example implementation of the present disclosure. The method 300 is an example only as there are a variety of ways to perform the method.

The method 300 may be performed using the configurations illustrated in FIG. 1 and FIG. 2 and various elements of these figures are referenced in explaining the method 300. Each block shown in FIG. 3 may represent one or more processes, methods, or subroutines performed.

Furthermore, the order of blocks is illustrative only and may change. Additional blocks may be added or less blocks may be utilized without departing from the present disclosure.

At block 310, the decoder module 124 receives an image frame of video data and determines a block unit from the image frame according to the received video data. The video data may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The decoder module 124 may determine the image frame based on the bitstream and divide the image frame to determine the block unit according to a plurality of partition indications in the bitstream. For example, the decoder module 124 may divide the image frames to generate a plurality of coding tree units and may further divide one of the coding tree units to determine the block unit according to the partition indications (e.g., based on a video coding standard).

In at least one implementation, the entropy decoding unit 2241 may decode the bitstream to determine a plurality of prediction indications for the block unit and the decoder module 124 may further reconstruct the block unit based on the prediction indications. The prediction indications may include a plurality of flags and a plurality of indices.

At block 320, the decoder module 124 determines first motion information and second motion information from a candidate list and determines a split line of the block unit to reconstruct the block unit.

In at least one implementation, with reference to FIG. 2, the decoder module 124 may divide the block unit into a plurality of prediction areas, and reconstruct the prediction areas of the block unit based on the first motion information and the second motion information.

In at least one implementation, the prediction indications may include a partition index of the block unit. The partition index may indicate the split line of the block unit. In at least one implementation, the split line may be one of a diagonal split line and an anti-diagonal direction when the partition index is a triangle partition index. In at least one implementation, the partition index may indicate a partition angle index and a partition distance index when the partition index is a geometric partition index. The partition angle index may indicate an inclined angle of the split line, and the partition distance index may indicate a line offset between the split line and a center point of the block unit. Thus, the decoder module 124 may determine the split line based on the inclined angle and the line offset indicated by the partition index.

In at least one implementation, the prediction indications may include a first motion candidate index and a second motion candidate index. In at least one implementation, the first motion candidate index may indicate the first motion information in a merge candidate list, and the second motion candidate index may indicate the second motion information in the merge candidate list. In at least one implementation, a plurality of merge candidate modes in the merge candidate list may be selected from a plurality of spatial motion prediction modes of a plurality of neighboring blocks neighboring to the block unit, a plurality of temporal motion prediction modes of a plurality of collocated blocks, history-based motion prediction modes stored in a first-in-first-out (FIFO) table, a plurality of pair-wise average motion prediction modes, and a zero motion mode. In at least one implantation, the first motion information may indicate a first reference frame and a first reference vector, and the second motion information may indicate a second reference frame and a second reference vector. The first reference frame and the second reference frame may be selected from a plurality of reference lists of the block unit. In one implementation, the first reference frame and the second reference frame may be selected from the same one of the reference lists. In other implementations, the first reference frame and the second reference frame may be selected from different reference lists. In at least one implementation, the number of the reference lists may be equal to 2.

Figure 4A:
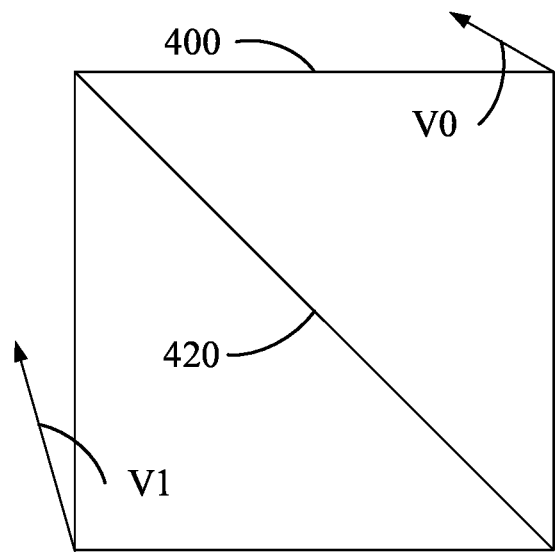
FIGS. 4A-4D are schematic illustrations of a block unit having different prediction areas separated based on a split line, according to example implementations of the present application.
Figure 4B:
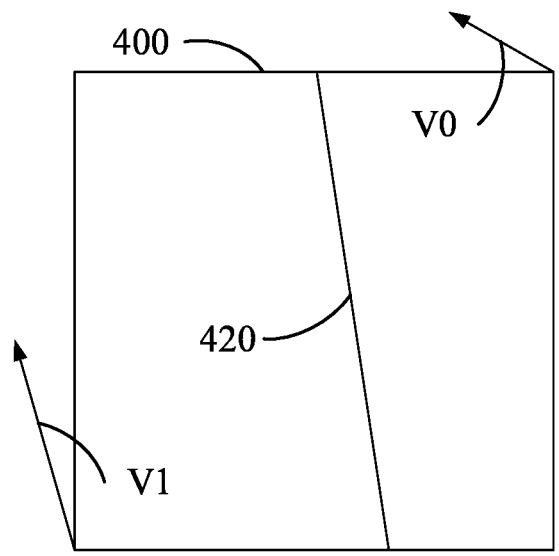
Figure 4C:
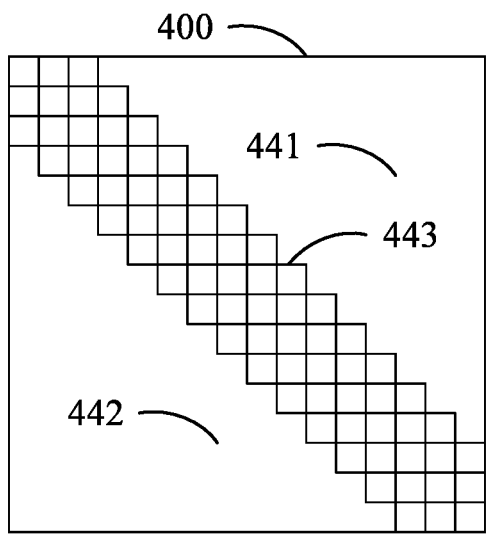
Figure 4D:
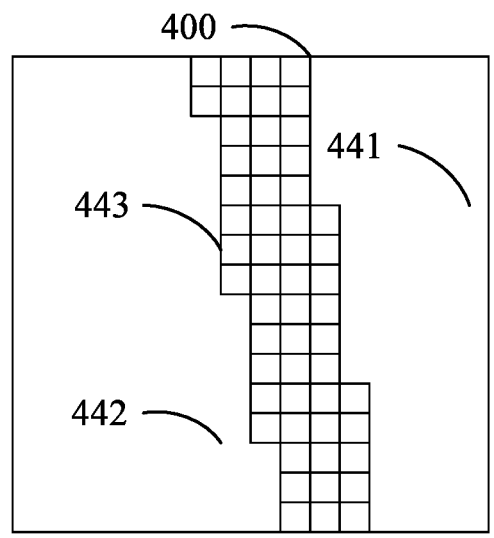

FIGS. 4A-4B are schematic illustrations of a block unit having different split lines, according to example implementations of the present application. In at least one implementation, the partition indications of the block unit 400 may indicate the split line 420, the first reference vector V0, the second reference vector V1, the first reference frame and the second reference frame. FIGS. 4C-4D are schematic illustrations of a block unit having different prediction areas separated based on the split line, according to example implementations of the present application. In the present implementation, the decoder module 124 may divide the block unit 400 based on the split line 420 to determine the prediction areas 441-443. In at least one implementation, the block unit may include a plurality of block components. In at least one implementation, the block components in the first prediction area 441 may be reconstructed based on the first reference vector and the first reference frame, and the block components in the second prediction area 442 may be reconstructed based on the second reference vector and the second reference frame. In addition, the block components in the third prediction area 443 may be reconstructed based on the first reference vector, the second reference vector, the first reference frame and the second reference frame. The block components in the third prediction area 443 may be reconstructed by deriving a plurality of first reference samples determined based on the first reference vector and the first reference frame and a plurality of second reference samples determined based on the second reference vector and the second reference frame and merging the first reference samples and the second reference samples based on a plurality of blending weights. In at least one implementation, the blending weights may be derived based on a plurality of component distances between the split line 420 and the block components in the third prediction area 443.

At block 330, the decoder module 124 determines a sub-block in the block unit.

In at least one implementation, with reference to FIG. 2, the decoder module 124 may divide the block unit to generate a plurality of sub-blocks. FIG. 5A is a schematic illustration of a block unit having a plurality of sub-blocks 561-576 each corresponding to a sub-block index (xSbIdx, ySbIdx), according to example implementations of the present application. In at least one implementation, the decoder module 124 may determine a specific one of the sub-blocks. In one implementation, the number numSbX of a plurality of first candidate indices for the first position index xSbIdx may be equal to four, and the number numSbY of a plurality of second candidate indices for the second position index ySbIdx may be equal to four. Thus, the first position index xSbIdx may be a number between zero and numSbX, and the second position index ySbIdx may be a number between zero and numSBY.

At block 340, the decoder module 124 determines whether the sub-block is included in a specific one of a plurality of block regions covering the split line. In at least one implementation, the method 300 may proceed to block 350 when the decoder module 124 determines that the sub-block is included the specific block region coving the split line. The method may end when the decoder module 124 determines that the sub-block is not included the specific block region.

In at least one implementation, with reference to FIG. 2, the decoder module 124 may divide the block unit to generate a plurality of block regions. FIGS. 5B-5C are schematic illustrations of a block unit having the different block regions separated based on the split line, according to example implementations of the present application.

In at least one implementation, the decoder module 124 may categorize the sub-blocks 561-576 into the block regions based on the sub-block indices. In at least one implementation, the third block region 583 may cover the split line 420, and the first block region 581 and the second block region may not cover the split line 420. Most of the block components of the sub-blocks in the first block region 581 may be reconstructed based on the first motion information, and most of the block components of the sub-blocks in the second block region 582 may be reconstructed based on the second motion information. Thus, the decoder module 124 may store the first motion information for the sub-block when the sub-block is included in the first block region 581 corresponding to the first prediction area 441. For example, the decoder module 124 may store the first motion information for the sub-blocks 562-564, 567-568 and 572, since the sub-blocks 562-564, 567-568 and 572 are included in the first block region 581. In addition, the decoder module 124 may store the second motion information for the sub-block when the sub-block is included in the second block region 582 corresponding to the second prediction area 442. For example, the decoder module 124 may store the second motion information for the sub-blocks 565, 569-570 and 573-575, since the sub-blocks 562-564, 567-568 and 572 are included in the second block region 582. The decoder module 124 may directly store a corresponding one of the first motion information and the second motion information for the sub-blocks included in the other block regions different from the specific block region 583 coving the split line, the method 300 may end without other procedure.

In at least one implementation, most of the block components of the sub-blocks in the third block region 583 may be reconstructed based on the first motion information and the second motion information. Thus, the method 300 may proceed to block 350 for the decoder module 124 to determine how to store at least one of the first motion information and the second motion information for the sub-block when the sub-block is included in the third block region 583 corresponding to the third prediction area 443.

At block 350, the decoder module 124 determines whether the first list flag of the first motion information is identical to the second list flag of the second motion information. In at least one implementation, the method 300 may proceed to block 360 when the first list flag is identical to the second list flag. The method 300 may proceed to block 370 when the first list flag is different from the second list flag.

In at least one implementation, with reference to FIGS. 2 and 5B, the decoder module 124 may compare the first list flag with the second list flag when the sub-block is included in the specific block region 583. Most of the block components in the sub-block may be reconstructed based on the first motion information and the second motion information when the sub-block is included in the specific block region 583. Thus, the block components in the specific block region 583 may be reconstructed based on the reference frames in two different reference lists when the first list flag is different from the second list flag. In addition, the block components in the specific block region 583 may be reconstructed based on the reference frames in the same reference list when the first list flag is identical to the second list flag.

At block 360, the decoder module 124 stores a predefined one of the first motion information and the second motion information for the sub-block when the first list flag is identical to the second list flag.

In at least one implementation, with reference to FIGS. 2 and 5B, most of the block components in the sub-block may be reconstructed by deriving the first reference samples and the second reference samples from one of the reference lists when the first list flag of the block unit 400 is identical to the second list flag of the block unit 400 and the sub-block is included in the specific block region 583.

Since the motion information is stored for a plurality of following blocks to be reconstructed based on the stored motion information, the stored motion information may not influence a plurality of residual components generated based on blending results of the first reference samples and the second reference samples. Thus, with reference to FIG. 1, the encoder module 114 and the decoder module 124 may store the same motion information for the sub-block when the encoder module 114 and the decoder module 124 perform the method 300 to store the predefined one of the first motion information and the second motion information. In at least one implementation, the decoder module 124 may directly store the predefined one of the first motion information and the second motion information to decrease the usage of a buffer when the first reference frame and the second reference frame are included in the same reference list. Thus, the decoder module 124 stores the predefined one of the first motion information and the second motion information for the sub-block.

In at least one implementation, the decoder module 124 may directly store the predefined one of the first motion information and the second motion information as the stored motion information for the sub-block without further checking the relationship between the two reference frames and other reference lists. The decoder module 124 may directly store the predefined motion information without checking whether at least one of the first reference frame and the second reference frame are included in a specific one of the reference lists indicated by a specific one of a plurality of flag values different from the first list flag and the second list flag when the first list flag is identical to the second list flag. For example, the number of the reference lists is equal to two, so the flag values may include zero and one. In one implementation, the specific flag value is equal to one when the first list flag and the second list flag are equal to zero. The first list flag and the second list flag may indicate a first reference list L0 and the specific flag value may indicate a second reference list L1. Thus, the decoder module 124 may directly store the predefined motion information without checking whether at least one of the first reference frame and the second reference frame are included in the second reference list L1 indicated by the specific flag value equal to one when the first list flag and the second list flag are equal to zero.

In at least one implementation, the predefined one of the first motion information and the second motion information may be the second motion information. Thus, the decoder module 124 directly stores the second motion information for the sub-block. Since the second motion information is derived from the second candidate index of the block unit in the bitstream, the stored motion information may be derived from the second candidate index in the bitstream.

At block 370, the decoder module 124 stores both of the first motion information and the second motion information for the sub-block.

In at least one implementation, with reference to FIGS. 2 and 5B, most of the block components in the sub-block may be reconstructed by deriving the first reference samples and the second reference samples from the different reference lists when the first list flag of the block unit 400 is different from the second list flag of the block unit 400 and the sub-block is included in the specific block region 583.

In at least one implementation, most of the block components in the sub-block may be reconstructed by deriving the first reference samples from the first reference list and deriving the second reference samples from the second reference list when the first list flag of the block unit 400 is different from the second list flag of the block unit 400 and the sub-block is included in the specific block region 583. Thus, the decoder module 124 may directly store the first motion information and the second motion information for the sub-block without further determination.

In at least one implementation, the decoder module 124 may directly store the predefined one of the first motion information and the second motion information for the sub-block having the same reference list and directly store both the first motion information and the second motion information for the sub-block having different reference lists. Thus, the decoder module 124 may determine, based only on a comparison between the first list flag and the second list flag, whether the first motion information and the second motion information are stored together as a stored motion information for the sub-block, when the sub-block is included in the specific block region 583.

At block 380, the decoder module 124 reconstructs the following block based on the stored motion information when the following block is predicted based on the sub-block.

In at least one implementation, with reference to FIG. 2, the decoder module 124 may keep reconstructing the image frame and a plurality of following frames after the block unit is reconstructed. Thus, the stored information of the block unit may be used to reconstruct following blocks in the images frame and the following frames. In at least one implementation, the following frames may include a plurality of unreconstructed frames reconstructed after the reconstruction of the image frame. In addition, the following blocks may include a plurality of unreconstructed blocks in the image frame and the following frames. The unreconstructed blocks may be reconstructed after the reconstruction of the block unit.

Figure 6:
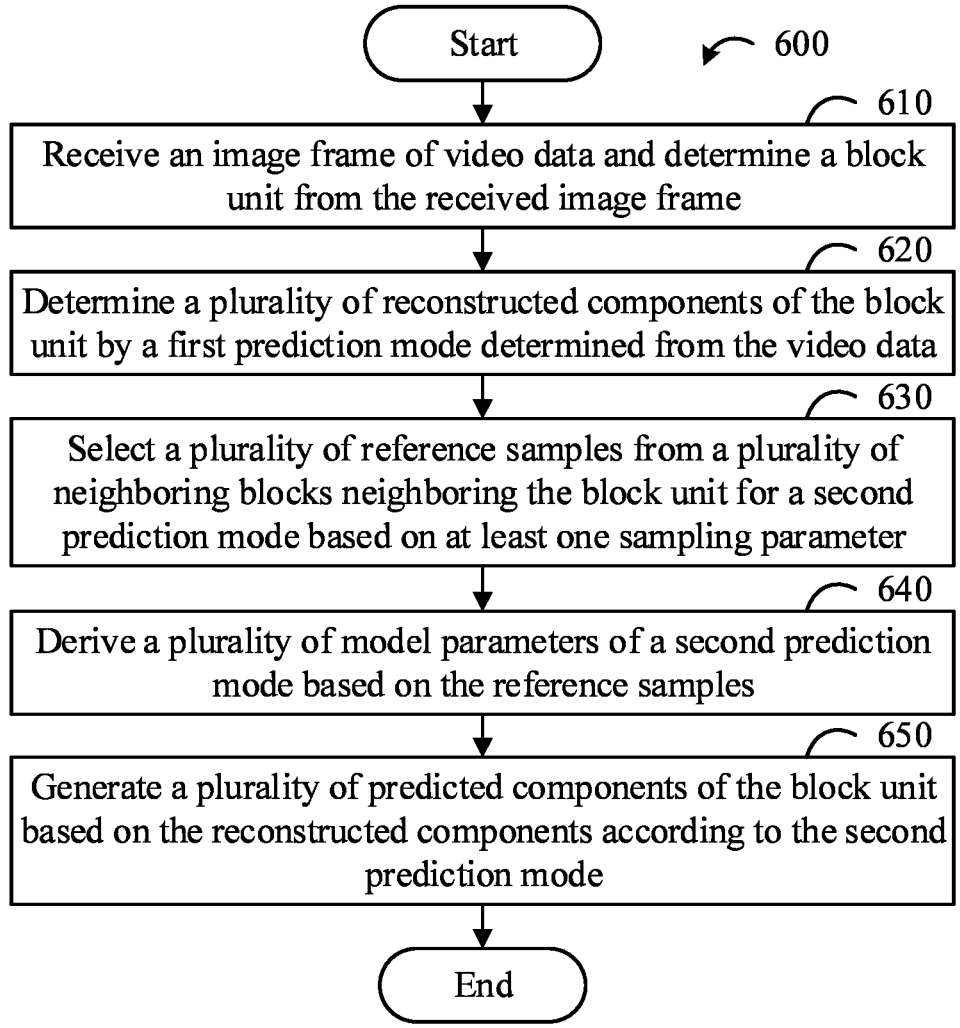
FIG. 6 illustrates a flowchart of another example reconstruction method for reconstructing a block unit according to an example implementation of the present disclosure.

FIG. 6 illustrates a flowchart of an example method 600 for reconstructing a block unit according to an example implementation of the present disclosure. The method 600 is an example only as there are a variety of ways to perform the method.

The method 600 may be performed using the configurations illustrated in FIG. 1 and FIG. 2 and various elements of these figures are referenced in explaining the method 600. Each block shown in FIG. 6 may represent one or more processes, methods, or subroutines performed.

Furthermore, the order of blocks is illustrative only and may change. Additional blocks may be added or less blocks may be utilized without departing from the present disclosure.

At block 610, the decoder module 124 receives an image frame of video data and determines a block unit from the image frame according to the received video data. The video data may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The decoder module 124 may determine the image frame based on the bitstream and divide the image frame to determine the block unit according to a plurality of partition indications in the bitstream. For example, the decoder module 124 may divide the image frame to generate a plurality of coding tree units and may further divide one of the coding tree units to determine the block unit according to the partition indications (e.g., based on a video coding standard).

In at least one implementation, the entropy decoding unit 2241 may decode the bitstream to determine a plurality of prediction indications for the block unit and the decoder module 124 may further reconstruct the block unit based on the prediction indications. The prediction indications may include a plurality of flags and a plurality of indices.

At block 620, the decoder module 124 determines a plurality of reconstructed components of the block unit by a first prediction mode determined from the video data.

In at least one implementation, the block unit may include a plurality of first block components and a plurality of second block components. In the implementation, the first block components may be a plurality of luma block components, and the second block components may be a plurality of chroma block components. In at least one implementation, the prediction indications may include at least one first prediction flag to indicate how to reconstruct the first block components of the block unit. For example, the prediction indications may include a prediction mode flag to select the first prediction mode from an intra prediction mode and an inter prediction.

In at least one implementation, with reference to FIG. 2, the decoder module 124 may determine the first prediction mode based on the at least one first prediction flag in the bitstream and reconstruct the block unit based on the first prediction mode. In at least one implementation, the decoder module 124 may determine a plurality of neighboring blocks neighboring the block unit and reconstruct the first block components of block unit to determine the reconstructed components based on the neighboring blocks when the first prediction mode is the intra prediction mode. In at least one implementation, the decoder module 124 may determine a plurality of reference frames reconstructed prior to reconstructing the image frame and reconstruct the first block components of block unit to determine the reconstructed components based on the reference frames when the first prediction mode is the inter prediction mode. Thus, the reconstructed components are derived for the luma block components of the block unit.

At block 630, the decoder module 124 selects the plurality of reference samples from a plurality of neighboring blocks neighboring the block unit for a second prediction mode based on at least one sampling parameter.

In at least one implementation, the prediction indications may include at least one second prediction flag to indicate how to reconstruct the second block components of the block unit. For example, the prediction indications may include a linear model flag to determine whether the second block components are predicted based on a linear model mode. In at least one implementation, the prediction indications may include a linear model index for selecting a prediction model mode from a plurality of candidate model modes when the linear model flag is equal to one.

Figure 7:
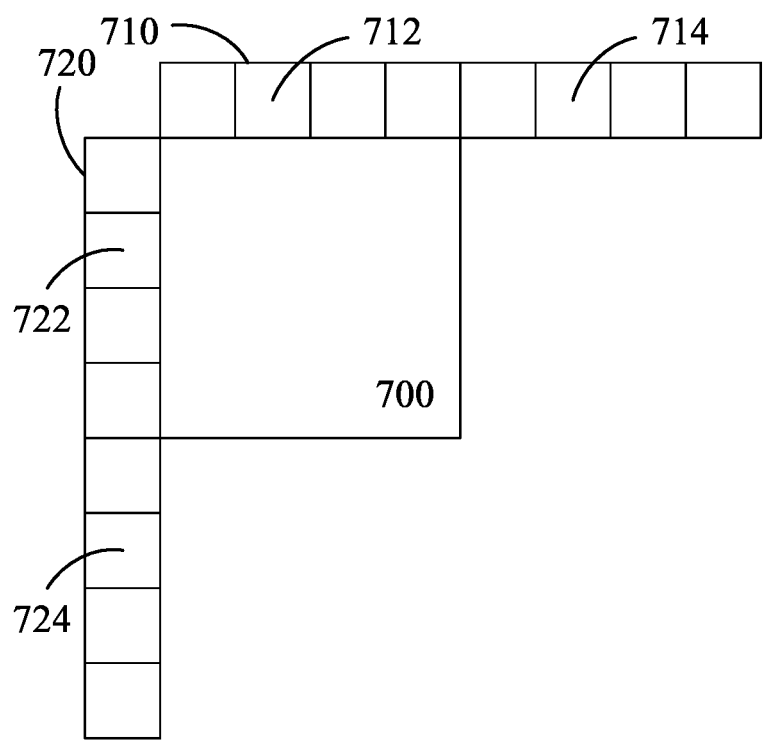
FIG. 7 is a schematic illustration of a block unit and a plurality of reference samples, according to example implementations of the present application.

In at least one implementation, the at least one sampling parameter may include at least one of a starting parameter, an interval parameter and a quantity parameter. FIG. 7 is a schematic illustration of a block unit and a plurality of reference samples, according to example implementations of the present application. In at least one implementation, the starting parameter of the block unit 700 may be determined from a plurality of starting candidates, the interval parameter of the block unit 700 may be determined from a plurality of interval candidates, and the quantity parameter of the block unit 700 may be determined from a plurality of quantity candidates.

In at least one implementation, the starting parameter of the block unit 700 may be equal to a specific one of the starting candidates determined from the bitstream. In at least one implementation, at least one starting point of the block unit 700 may be directly set based on the specific starting candidate determined for the block unit 700. Each of the starting candidates may be an integral candidate $C_i$. For example, the at least one starting point may include two starting points $(S_i, -1)$ and $(-1, S_i)$ when the specific integral candidate $C_i$ is equal to a starting integer $S_i$. With reference to FIG. 7, the starting integer $S_i$ may be equal to two, so the two starting points 712 and 722 in a first reference line 710 and a second reference line 720 are located at $(2, -1)$ and $(-1, 2)$. In at least one implementation, the at least one starting point of the block unit 700 may be calculated based on a block size W×H and the specific starting candidate of the block unit 700. In the implementation, each of the starting candidates may be a fractional candidate $C_f$. For example, the two starting points may be located at $(S_f \times W, -1)$ and $(-1, S_f \times H)$ when the specific fractional candidate $C_f$ is equal to a starting fraction $S_f$. With reference to FIG. 7, the starting fraction $S_f$ may be equal to ½. In another implementation, each of the starting candidates may include the integral candidate $S_i$ and the fractional candidate $S_f$. For example, the two starting points may be located at $(S_i+S_f \times W, -1)$ and $(-1, S_i+S_f \times H)$ when the specific integral candidate $C_i$ is equal to the starting integer $S_i$ and the specific fractional candidate $C_f$ is equal to the starting fraction $S_f$. In at least one implementation, the at least one starting point of the block unit 700 may be calculated based on a starting base $S_b$ and the specific starting candidate of the block unit 700. In the implementation, each of the starting candidates may be the integer candidate $C_i$. For example, the two starting points may be located at $(S_b \times S_i, -1)$ and $(-1, S_b \times S_i)$ when the specific integer candidate $C_i$ is equal to the starting integer $S_i$. In another implementation, the two starting points may be located at $(S_b+S_i, -1)$ and $(-1, S_b+S_i)$ when the specific integer candidate $C_i$ is equal to the starting integer $S_i$. In at least one implementation, the at least one starting point of the block unit 700 may be calculated based on the starting base $S_b$, an interval base $I_b$ and the specific starting candidate of the block unit 700. In the implementation, each of the starting candidates may be the integer candidate $C_i$. For example, the two starting points may be located at $(S_b+I_b \times S_i, -1)$ and $(-1, S_b+I_b \times S_i)$ when the specific integer candidate $C_i$ is equal to the starting integer $S_i$. In at least one implementation, the starting base $S_b$ and interval base $I_b$ may be derived as follows:

$Sb = \text{numSamp}N >> (2+\text{num}Is4N)$ $Ib = \text{Max}(1, \text{numSamp}N >> (1+\text{num}Is4N))$ $\text{num}Is4N = (\text{availT \&\& availL \&\&}$
$\quad \text{predModeIntra} == \text{INTRA\_LT\_CCLM}) ? 0 : 1$ where numSampN represents the number of available neighbouring chroma samples on the top and top-right numSampT or the number of available neighbouring chroma samples on the left and left-below numSampL, availT and availL represents availabilities of the neighboring blocks, predModeIntra represents the intra prediction mode of the block unit, and INTRA_LT_CCLM is one of cross component linear model mode candidates.

In at least one implementation, each of the interval candidates may be an integral candidate $I_i$. A distance between two neighboring reference samples may be set equal to the interval parameter selected from the integral candidates $I_i$. With reference to FIG. 7, the interval parameter may be equal to four, so the two second reference samples 714 and 724 in the first reference line 710 and the second reference line 720 are located at $(6, -1)$ and $(-1, 6)$. In at least one implementation, the distance between two neighboring reference samples may be calculated based on the interval base $I_b$ and the interval parameter of the block unit 700. In the implementation, each of the interval candidates may be equal to a positive integer. For example, the distance between two neighboring reference samples may be equal to $I_b \times I_i$ when the interval parameter is equal to an interval integer $I_i$. In addition, the distance between two neighboring reference samples may be equal to $I_b+I_i$ when the interval parameter is equal to the interval integer $I_i$. In at least one implementation, the distance between two neighboring reference samples may be calculated based on the interval base $I_b$, a derived starting base $S_d$ and the interval parameter of the block unit 700. In the implementation, each of the interval candidates may be equal to a positive integer. For example, the distance between two neighboring reference samples may be equal to $I_b+S_d \times I_i$ when the interval parameter is equal to the interval integer $I_i$. In at least one implementation, the quantity candidates may include a plurality of top quantity candidates and a plurality of left quantity candidates. The number of the reference samples above the block unit 700 may be equal to the quantity parameter selected from the top quantity candidates and the number of the reference samples in the left side of the block unit 700 may be equal to the quantity parameter selected from the left quantity candidates. With reference to FIG. 7, the quantity parameter may be equal to two for indicating that the number of the reference samples above the block unit 700 is equal to two and the number of the reference samples in the left side of the block unit 700 is equal to two. Thus, there are only four reference samples 712, 714, 722 and 724 for the block unit 700.

In at least one implementation, the at least one sampling parameter may be the starting parameter. In one implementation, the starting parameter may be set in the plurality of candidate model modes. Thus, the starting parameter may be determined from the prediction model mode when the decoder module 124 selects the prediction model mode from the candidate model modes. In other implementations, the starting parameter may be determined based on a starting index determined from the bitstream. Thus, the decoder module 124 determine the starting parameter based on the value of the starting index.

In at least one implementation, the at least one sampling parameter may include the starting parameter, the interval parameter and the quantity parameter. In at least one implementation, the starting parameter, the interval parameter and the quantity parameter may be set in the plurality of candidate model modes. For example, the first candidate model mode may include a first starting candidate S1, a first interval candidate I1 and a first quantity candidate Q1, and the Nth candidate model mode may include a Nth starting candidate Sn, a Nth interval candidate In and a Nth quantity candidate Qn. In one implementation, the starting candidates S1-Sn may be equal to or different from each other, the interval candidates I1-In may be equal to or different from each other, and the quantity candidates Q1-Qn may be equal to or different from each other. For example, the starting candidates S1-S2 may be equal to each other, the starting candidate S3-S4 may be equal to each other and different from the starting candidates S1-S2, each of the interval candidates I1-I4 may be equal to each other, the quantity candidates Q1 and Q3 may be equal to each other, and the quantity candidates Q2 and Q4 may be equal to each other and different from the quantity candidates Q1 and Q3 when the number of the candidate model modes is equal to four.

At block 640, the decoder module 124 derives a plurality of model parameters of the second prediction mode based on the reference samples.

In at least one embodiment, with reference to FIGS. 2 and 7, the decoder module 124 may determine a plurality of first reference components and a plurality of second reference components in the reference samples. In at least one implementation, the first reference components may be a plurality of luma reference components, and the second reference components may be a plurality of chroma reference components. In at least one implementation, the decoder module 124 may down-sample the first reference components to generate a plurality of down-sampled reference components. In at least one implementation, each of the down-sampled reference components is generated based on N of the first reference components. In one implementation, the number N may be equal to 2×K, and the number K may be an integer. For example, the number K may be equal to two and the number N may be equal to four.

In at least one implementation, the decoder module 124 may derive the model parameters of a model equation based on the reference samples. In one implementation, the decoder module 124 may derive the model equation based on the first reference components and the second reference components. In other implementations, the decoder module 124 may derive the model equation based on the down-sampled reference components and the second reference components. In at least one implementation, the model equation of the block unit may be derived as follows:

$$Pred_c[x,y] = \alpha \times Rec'_L[x,y] + \beta$$

where $Pred_c(x,y)$ represents a plurality of predicted components in the block unit and $Rec_L'(x,y)$ represents a plurality of down-sampled reconstructed components of the same block unit. In at least one implementation, the model parameters $\alpha$ and $\beta$ are derived based on the reference samples.

In at least one implementation, the decoder module 124 may select two smaller values X a0 and X a1 and two larger values X b0 and X b1 of the down-sampled reference components and determine four of the second reference components Y a0, Y a1, Y b0 and Y b1 corresponding to the four selected down-sampled reference components. Then, the decoder module 124 determines a first average XA of X a0 and X a1, a second average XB of X b0 and X b1, a third average YA of Ya 0 and Y a1, and a fourth average YB of Y b0 and Y b1. The model parameter $\alpha$ may be equal to (Ya-Yb)/(Xa-Xb), and the model parameter $\beta$ may be equal to Yb-$\alpha$×xb. In at least one implementation, the model parameters $\alpha$ and $\beta$ may be derived based on the reference samples by any other derived method.

At block 650, the decoder module 124 generates a plurality of predicted components of the block unit based on the reconstructed components according to the second prediction mode.

In at least one implementation, with reference to FIG. 2, the decoder module 124 may down-sample the reconstructed components to generate the down-sampled reconstructed components. In at least one implementation, each of the down-sampled reconstructed components may be generated based on M of the first reference components. In one implementation, the number M may be equal to 2×L, and the number L may be an integer. For example, the number L may be equal to two and the number M may be equal to four. In at least one implementation, the number K may be equal to the number L, and the number N may be equal to the number M.

In at least one implementation, the decoder module 124 may substitute the down-sampled reconstructed components into the model equation to generate the predicted components. Thus, the predicted components may be generated for the chroma block components of the block unit. The chroma block components of the block unit may be reconstructed by adding the predicted components into a plurality of residual components of the block unit determined from the bitstream. In at least one implementation, the residual components of the block unit may be a plurality of chroma residual components. In at least one implementation, the decoder module 124 may reconstruct all other block units in the image frame for reconstructing the image frame and the video.

Figure 8:
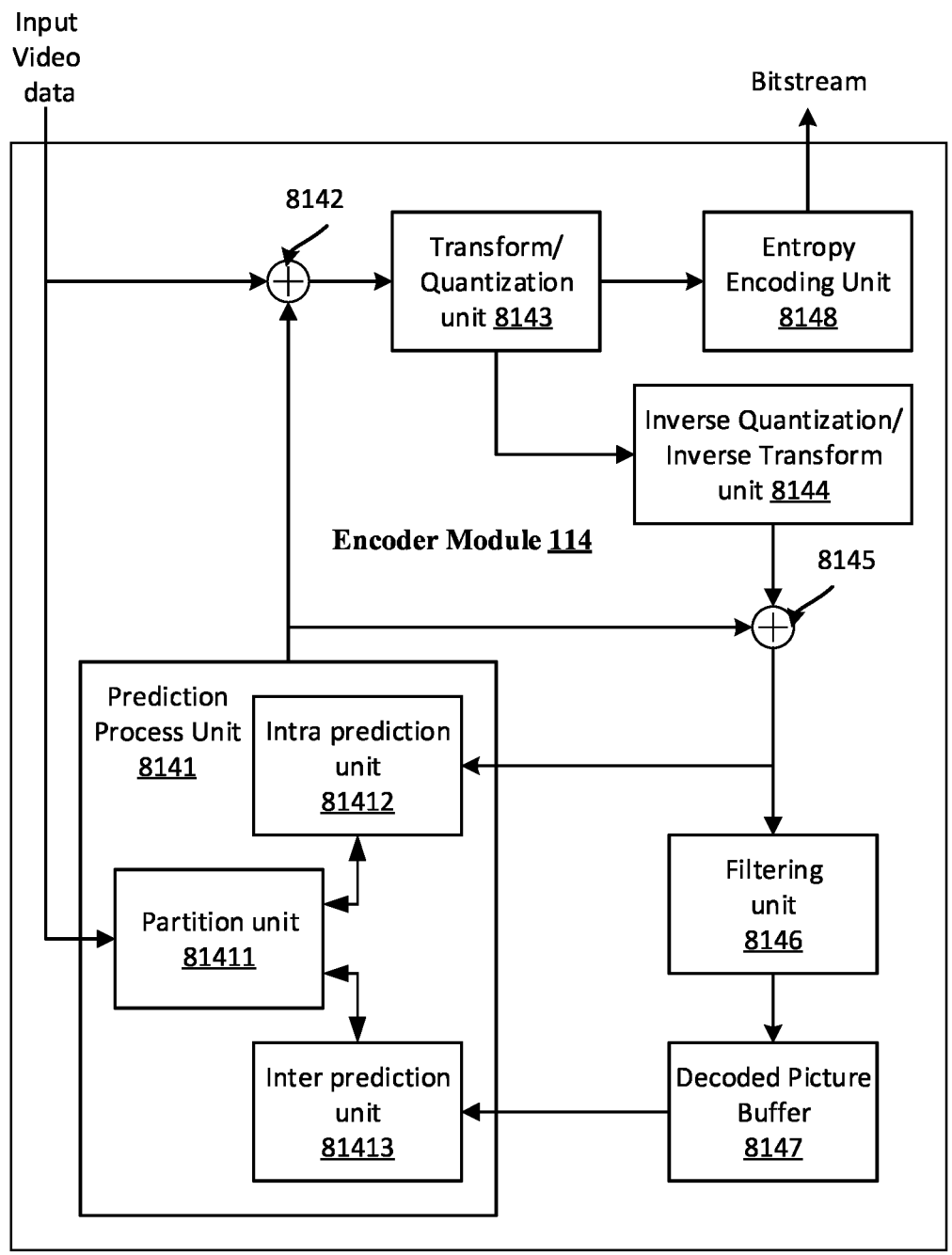
FIG. 8 illustrates a block diagram of an example encoder module of the first electronic device in FIG. 1 according to an example implementation of the present application.

FIG. 8 illustrates the encoder module 114 in FIG. 1. The encoder module 114 may include a prediction processor (e.g., a prediction process unit 8141), at least a first summer (e.g., a first summer 8142) and a second summer (e.g., a second summer 8145), a transform/quantization processor (e.g., a transform/quantization unit 8143), an inverse quantization/inverse transform processor (e.g., an inverse quantization/inverse transform unit 8144), a filter (e.g., a filtering unit 8146), a decoded picture buffer (e.g., a decoded picture buffer 8147), and an entropy encoder (e.g., an entropy encoding unit 8148). The prediction process unit 8141 of the encoder module 114 may further include a partition processor (e.g., a partition unit 81411), an intra prediction processor (e.g., an intra prediction unit 81412), and an inter prediction processor (e.g., an inter prediction unit 81413). The encoder module 114 may receive the source video and encode the source video to output a bitstream.

The encoder module 114 may receive a source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

In at least one implementation, the encoder module 114 may perform additional sub-divisions of the source video. It should be noted that implementations are generally applicable to video coding regardless of how the source video is partitioned prior to and/or during the encoding.

In at least one implementation, during the encoding process, the prediction process unit 8141 may receive a current image block of a specific one of the image frames during the encoding process. The current image block may be the luminance block or one of the chrominance blocks in the specific image frame.

The partition unit 81411 may divide the current image block into multiple block units. The intra prediction unit 81412 may perform intra-predictive coding of a current block unit relative to one or more neighboring blocks in the same frame as the current block unit in order to provide spatial prediction. The inter prediction unit 81413 may perform inter-predictive coding of the current block unit relative to one or more blocks in one or more reference image blocks to provide temporal prediction.

In at least one implementation, the prediction process unit 8141 may select one of the coding results generated by the intra prediction unit 81412 and the inter prediction unit 81413 based on a mode selection method, such as a cost function. The mode selection method may be a rate-distortion optimization (RDO) process.

The prediction process unit 8141 may determine the selected coding result and provide a predicted block corresponding to the selected coding result to the first summer 8142 for generating a residual block and to the second summer 8145 for reconstructing the encoded block unit. The prediction process unit 8141 may further provide syntax elements such as motion vectors, intra mode indicators, partition information, and other syntax information to the entropy encoding unit 8148.

In at least one implementation, the intra prediction unit 81412 may intra predict the current block unit. The intra prediction unit 81412 may determine an intra prediction mode directed toward a reconstructed sample neighboring the current block unit in order to encode the current block unit.

In at least one implementation, the intra prediction unit 81412 may encode the current block unit using various intra prediction modes and the intra prediction unit 81412 or the prediction process unit 8141 may select an appropriate intra prediction mode from the selected modes. The intra prediction unit 81412 may encode the current block unit using a cross component prediction mode to predict one of the two chroma components of the current block unit based on the luma components of the current block unit. The intra prediction unit 81412 may predict a first one of the two chroma components of the current block unit based on the second of the two chroma components of the current block unit.

In at least one implementation, the inter prediction unit 81413 may inter predict the current block unit as an alternative to the intra prediction performed by the intra prediction unit 81412. The inter prediction unit 81413 may perform motion estimation to estimate motion of the current block unit for generating a motion vector.

The motion vector may indicate a displacement of the current block unit within the current image block relative to a reference block unit within a reference image block. The inter prediction unit 81413 may receive at least one reference image block stored in the decoded picture buffer 8147 and estimate the motion based on the received reference image blocks to generate the motion vector.

In at least one implementation, the first summer 8142 may generate the residual block by subtracting the prediction block determined by the prediction process unit 8141 from the original current block unit. The first summer 8142 may represent the component or components that perform this subtraction operation.

In at least one implementation, the transform/quantization unit 8143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform or a conceptually similar transform.

In at least one implementation, the transform may convert the residual information from a pixel value domain to a transform domain, such as a frequency domain. The degree of quantization may be modified by adjusting a quantization parameter.

In at least one implementation, the transform/quantization unit 8143 may perform a scan of the matrix including the quantized transform coefficients. Alternatively, the entropy encoding unit 8148 may perform the scan.

In at least one implementation, the entropy encoding unit 8148 may receive a plurality of syntax elements from the prediction process unit 8141 and the transform/quantization unit 8143 including a quantization parameter, transform data, motion vectors, intra modes, partition information, and other syntax information. The entropy encoding unit 8148 may encode the syntax elements into the bitstream.

In at least one implementation, the entropy encoding unit 8148 may entropy encode the quantized transform coefficients by performing CAVLC, CABAC, SBAC, PIPE coding or another entropy coding technique to generate an encoded bitstream. The encoded bitstream may be transmitted to another device (e.g., the second electronic device 120 in FIG. 1) or archived for later transmission or retrieval.

In at least one implementation, the inverse quantization/inverse transform unit 8144 may apply inverse quantization and inverse transformation to reconstruct the residual block in the pixel domain for later use as a reference block. The second summer 8145 may add the reconstructed residual block to the prediction block provided from the prediction process unit 8141 in order to produce a reconstructed block for storage in the decoded picture buffer 8147.

In at least one implementation, the filtering unit 8146 may include a deblocking filter, a SAO filter, a bilateral filter, and/or an ALF to remove blocking artifacts from the reconstructed block. Additional filters (in loop or post loop) may be used in addition to the deblocking filter, the SAO filter, the bilateral filter and the ALF. Such filters are not shown for brevity and may filter the output of the second summer 8145.

In at least one implementation, the decoded picture buffer 8147 may be a reference picture memory that stores the reference block for use by the encoder module 114 to encode video, such as in intra or inter coding modes. The decoded picture buffer 8147 may include a variety of memory devices such as DRAM, including SDRAM, MRAM, RRAM, or other types of memory devices. The decoded picture buffer 8147 may be on-chip with other components of the encoder module 114 or off-chip relative to those components.

In at least one implementation, the encoder module 114 may perform the example reconstruction method 300 for reconstructing a block unit as shown in FIG. 3. The method 300 may be performed using the configurations illustrated in FIG. 1 and FIG. 8 and various elements of these figures are referenced in explaining the method 300. Each block shown in FIG. 3 may represent one or more processes, methods, or subroutines performed. Furthermore, the order of blocks is illustrative only and may change. Additional blocks may be added or less blocks may be utilized without departing from the present disclosure.

At block 310, an encoder module 114 receives an image frame of video data and determines a block unit from the image frame according to the received video data. The video data may be a video.

In at least one implementation, with reference to FIGS. 1 and 8, the first electronic device 110 may receive the video via the source module 112. The encoder module 114 may determine the image frame from the video and divide the image frame to determine the block unit.

In at least one implementation, the prediction process unit 8141 of the first electronic device 110 may determine the block unit from the video via the partition unit 81411 and the encoder module 114 may provide a plurality of partition indications into a bitstream based on a partition result of the partition unit 81411.

At block 320, the encoder module 114 determines first motion information and second motion information from a candidate list and determines a split line of the block unit to reconstruct the block unit.

In at least one implementation, with reference to FIG. 8, the encoder module 114 may generate a plurality of coding results generated by the intra prediction unit 81412 and the inter prediction unit 81413. Then, the encoder module 114 may select one of the coding results based on a mode selection method, such as a cost function. The mode selection method may be a rate-distortion optimization (RDO) process. In at least one implementation, the encoder module 114 may divide the block unit into a plurality of prediction areas and predict the prediction areas of the block unit based on the first motion information and the second motion information when the selected coding result is generated based on the split line, the first motion information and the second motion information.

In at least one implementation, the split line may be one of a diagonal split line and an anti-diagonal direction when the split line is generated based on a triangle partition mode. In at least one implementation, the split line may be determined by an inclined angle of the split line and a line offset between the split line and a center point of the block unit when the split line is generated based on a geometric partition mode. Thus, the encoder module 114 may provide, into the bitstream, a partition index of the split line indicating the inclined angle and the line offset.

In at least one implementation, the first motion information and the second motion information may be included in a merge candidate list of the block unit. In at least one implantation, the first motion information may indicate a first reference frame and a first reference vector, and the second motion information may indicate a second reference frame and a second reference vector. The first reference frame and the second reference frame may be selected from a plurality of reference lists of the block unit.

In at least one implementation, with reference to FIG. 8, the first summer 8142 of the encoder module 114 in the first electronic device 110 may generate a residual block based on the selected coding result and provide a bitstream to the second electronic device 120 including a plurality of coefficients corresponding to a plurality of residual components in the residual block.

In at least one implementation, the encoder module 114 may reconstruct the block unit again based on the selected coding result for predicting the other block units in the image frame. The block unit may be reconstructed by adding the selected coding result into the residual block of the sub-block.

At block 330, the encoder module 114 determines a sub-block in the block unit.

In at least one implementation, with reference to FIGS. 5A and 8, the encoder module 114 may divide the block unit 400 to generate a plurality of sub-blocks 561-576.

At block 340, the encoder module 114 determines whether the sub-block is included in a specific one of a plurality of block regions covering the split line. In at least one implementation, the method 300 may proceed to block 350 when the encoder module 114 determines that the sub-block is included the specific block region coving the split line. The method may end when encoder module 114 determines that the sub-block is not included the specific block region.

In at least one implementation, with reference to FIGS. 5B-5C and 8, the encoder module 114 may divide the block unit to generate a plurality of block regions 581-583. In at least one implementation, the encoder module 114 may categorize the sub-blocks 561-576 into the block regions 581-583. In at least one implementation, the third block region 583 may cover the split line 420, and the first block region 581 and the second block region may not cover the split line 420. Most of the block components of the sub-blocks in the first block region 581 may be predicted based only on the first motion information, and most of the block components of the sub-blocks in the second block region 582 may be predicted based only on the second motion information. Thus, the encoder module 114 may store the first motion information for the sub-block when the sub-block is included in the first block region 581 corresponding to the first prediction area 441. In addition, the encoder module 114 may store the second motion information for the sub-block when the sub-block is included in the second block region 582 corresponding to the second prediction area 442.

In at least one implementation, most of the block components of the sub-blocks in the third block region 583 may be predicted based on the first motion information and the second motion information. Thus, the method 300 may proceed to block 350 for the encoder module 114 to determine how to store at least one of the first motion information and the second motion information for the sub-block when the sub-block is included in the third block region 583 corresponding to the third prediction area 443.

At block 350, the encoder module 114 determines whether the first list flag of the first motion information is identical to the second list flag of the second motion information. In at least one implementation, the method 300 may proceed to block 360 when the first list flag is identical to the second list flag. The method 300 may proceed to block 370 when the first list flag is different from the second list flag.

In at least one implementation, with reference to FIGS. 5B-5C and 8, the encoder module 114 may compare the first list flag with the second list flag when the sub-block is included in the specific block region 583. The block components in the specific block region 583 may be predicted based on the reference frames in two different reference lists when the first list flag is different from the second list flag. In addition, the block components in the specific block region 583 may be predicted based on the reference frames in the same reference list when the first list flag is identical to the second list flag.

At block 360, the encoder module 114 stores a predefined one of the first motion information and the second motion information for the sub-block when the first list flag is identical to the second list flag.

In at least one implementation, with reference to FIGS. 5B-5C and 8, most of the block components in the sub-block may be predicted by deriving the first reference samples and the second reference samples from one of the reference lists when the first list flag of the block unit 400 is identical to the second list flag of the block unit 400 and the sub-block is included in the specific block region 583.

Since the motion information is stored for a plurality of following blocks to be predicted based on the stored motion information, the stored motion information may not influence a plurality of residual components of the block unit generated based on blending results of the first reference samples and the second reference samples. Thus, with reference to FIG. 1, the encoder module 114 and the decoder module 124 may store the same motion information for the sub-block when the encoder module 114 and the decoder module 124 perform the method 300 to store the predefined one of the first motion information and the second motion information. In at least one implementation, the encoder module 114 may directly store the predefined one of the first motion information and the second motion information to decrease the usage of a buffer when the first reference frame and the second reference frame are included in the same reference list. Thus, the encoder module 114 stores the predefined one of the first motion information and the second motion information for the sub-block.

In at least one implementation, the predefined one of the first motion information and the second motion information may be the second motion information. Thus, the encoder module 114 directly stores the second motion information for the sub-block. In at least one implementation, the bitstream may include a first candidate index indicating the first motion information and a second candidate index indicating the second motion information. Thus, the decoder module 124 may determine the predefined one of the first motion information and the second motion information from the second candidate index of the block unit in the bitstream.

At block 370, the encoder module 114 stores both of the first motion information and the second motion information for the sub-block.

In at least one implementation, with reference to FIGS. 5B-5C and 8, most of the block components in the sub-block may be predicted by deriving the first reference samples and the second reference samples from the different reference lists when the first list flag of the block unit 400 is different from the second list flag of the block unit 400 and the sub-block is included in the specific block region 583. Thus, the encoder module 114 directly store the first motion information and the second motion information for the sub-block without further determination.

In at least one implementation, the encoder module 114 may directly store the predefined one of the first motion information and the second motion information for the sub-block having the same reference list and directly store both of the first motion information and the second motion information for the sub-block having different reference list. Thus, the encoder module 114 may determine, based only on a comparison between the first list flag and the second list flag, whether the first motion information and the second motion information are stored together as the stored motion information for the sub-block, when the sub-block is included in the specific block region 583.

At block 380, the encoder module 114 reconstructs the following block on the stored motion information when the following block is predicted based on the sub-block.

In at least one implementation, with reference to FIG. 8, the encoder module 114 may keep predicting the image frame and a plurality of following frames after the block unit is reconstructed. Thus, the stored information of the block unit may be used to predict following blocks in the image frames and the following frames. In at least one implementation, the following frames may include a plurality of unpredicted frames predicted after the reconstruction of the image frame. In addition, the following blocks may include a plurality of unpredicted blocks in the image frame and the following frames. The unpredicted blocks may be predicted after the reconstruction of the block unit.

In at least one implementation, the encoder module 114 may perform the example reconstruction method 600 for reconstructing a block unit as shown in FIG. 6. The method 600 may be performed using the configurations illustrated in FIG. 1 and FIG. 8 and various elements of these figures are referenced in explaining the method 600. Each block shown in FIG. 6 may represent one or more processes, methods, or subroutines performed. Furthermore, the order of blocks is illustrative only and may change. Additional blocks may be added or less blocks may be utilized without departing from the present disclosure.

At block 610, an encoder module 114 receives an image frame of video data and determines a block unit from the image frame according to the received video data. The video data may be a video.

In at least one implementation, with reference to FIGS. 1 and 8, the first electronic device 110 may receive the video via the source module 112. The encoder module 114 may determine the image frame from the video and divide the image frame to determine the block unit.

In at least one implementation, the prediction process unit 8141 of the first electronic device 110 may determine the block unit from the video via the partition unit 81411 and the encoder module 114 may provide a plurality of partition indications into a bitstream based on a partition result of the partition unit 81411.

At block 620, the encoder module 114 determines a plurality of reconstructed components of the block unit by a first prediction mode determined from the video data.

In at least one implementation, the block unit may include a plurality of first block components and a plurality of second block components. The first block components may be a plurality of luma block components, and the second block components may be a plurality of chroma block components. In at least one implementation, with reference to FIG. 8, the encoder module 114 may generate a plurality of coding results generated by the intra prediction unit 81412 and the inter prediction unit 81413. Then, the encoder module 114 may select one of the coding results based on a mode selection method, such as a cost function. The mode selection method may be a rate-distortion optimization (RDO) process. A luma prediction mode for the selected coding result may be set as the first prediction mode. In at least one implementation, the first summer 8142 may generate a residual block by subtracting the coding result from the first block components. In at least one implementation the residual block may be transformed and quantized by the transform/quantization unit 8143. In at least one implementation, the inverse quantization/inverse transform unit 8144 may apply inverse quantization and inverse transformation to reconstruct the residual block in the pixel domain for later use as a reference block. The second summer 8145 may add the reconstructed residual block to the coding result provided from the prediction process unit 8141 in order to produce the reconstructed components for storage in the decoded picture buffer 8147. In at least one implementation, the reconstructed components are derived for the luma block components of the block unit.

At block 630, the encoder module 114 selects the plurality of reference samples from a plurality of neighboring blocks neighboring the block unit for a second prediction mode based on at least one sampling parameter.

In at least one implementation, with reference to FIG. 8, the encoder module 114 may select one of the coding results based on the mode selection method for the second block components. A chroma prediction mode for the selected coding result may be set as the second prediction mode. In at least one implementation, the second prediction mode may be selected from a plurality of candidate model modes.

In at least one implementation, the at least one sampling parameter may include at least one of a starting parameter, an interval parameter and a quantity parameter. In at least one implementation, the starting parameter of the block unit 700 may be determined from a plurality of starting candidates, the interval parameter of the block unit 700 may be determined from a plurality of interval candidates, and the quantity parameter of the block unit 700 may be determined from a plurality of quantity candidates.

In at least one implementation, the starting parameter of the block unit 700 may be equal to a specific one of the starting candidates determined from the bitstream. In one implementation, at least one starting point of the block unit 700 may be directly set based the specific starting candidate determined for the block unit 700. In the implementation, each of the starting candidates may be an integral candidate Ci. In one implementation, the at least one starting point of the block unit 700 may be calculated based on a block size W×H and the specific starting candidate of the block unit 700. In the implementation, each of the starting candidates may be a fractional candidate Cf, or include the integral candidate Ci and the fractional candidate Cf. In one implementation, the at least one starting point of the block unit 700 may be calculated based on a starting base Sb and the specific starting candidate of the block unit 700 by adding the starting base Sb into the specific starting candidate or by multiplying the starting base Sb by the specific starting candidate. In the implementation, each of the starting candidates may be the integer candidate Ci. In one implementation, the at least one starting point of the block unit 700 may be calculated based on the starting base Sb, an interval base Ib and the specific starting candidate of the block unit 700. In the implementation, each of the starting candidates may be the integer candidate Ci. In at least one implementation, each of the interval candidates may be an integral candidate Ii. A distance between two neighboring reference samples may be set equal to the interval parameter selected from the integral candidates Ii. In one implementation, the distance between two neighboring reference samples may be calculated based on the interval base Ib and the interval parameter of the block unit 700 by adding the interval base Ib into the interval parameter or by multiplying the interval base Ib by the interval parameter. In one implementation, the distance between two neighboring reference samples may be calculated based on the interval base Ib, a derived starting base Sd and the interval parameter of the block unit 700. In at least one implementation, the quantity candidates may include a plurality of top quantity candidates and a plurality of left quantity candidates. The number of the reference samples above the block unit 700 may be equal to the quantity parameter selected from the top quantity candidates and the number of the reference samples in the left side of the block unit 700 may be equal to the quantity parameter selected from the left quantity candidates.

In at least one implementation, the at least one sampling parameter may be the starting parameter. In one implementation, the starting parameter may be set in the plurality of candidate model modes.

In at least one implementation, the at least one sampling parameter may include the starting parameter, the interval parameter and the quantity parameter. In at least one implementation, the starting parameter, the interval parameter and the quantity parameter may be set in each of the candidate model modes.

At block 640, the encoder module 114 derives a plurality of model parameters of the second prediction mode based on the reference samples.

In at least one embodiment, with reference to FIG. 8, the encoder module 114 may determine a plurality of first reference components and a plurality of second reference components in the reference samples. In at least one implementation, the first reference components may be a plurality of luma reference components, and the second reference components may be a plurality of chroma reference components. In at least one implementation, the encoder module 114 may down-sample the first reference components to generate a plurality of down-sampled reference components.

In at least one implementation, the encoder module 114 may derive the model parameters of a model equation based on the reference samples. In at least one implementation, the model equation of the block unit may be derived as follows:

$$\text{Pred}_c[x,y] = \alpha \times \text{Rec}'_L[x,y] + \beta$$

where $\text{Pred}_c(x,y)$ represents a plurality of predicted components in the block unit and $\text{Rec}_L'(x,y)$ represents a plurality of down-sampled reconstructed components of the same block unit. In at least one implementation, the model parameters $\alpha$ and $\beta$ are derived based on the reference samples.

At block 650, the encoder module 114 generates a plurality of predicted components of the block unit based on the reconstructed components according to the second prediction mode.

In at least one implementation, with reference to FIG. 8, the encoder module 114 may down-sample the reconstructed components to generate the down-sampled reconstructed components. In at least one implementation, the encoder module 114 may substitute the down-sampled reconstructed components into the model equation to generate the predicted components. Thus, the predicted components may be generated for the chroma block components of the block unit. In at least one implementation, a chroma residual block may be generated by subtracting the predicted components from the original second block components in the video in the first summer 8142 and added back into the predicted components to generate a plurality of chroma reconstructed components in the second summer 8145. In at least one implementation, the encoder module 114 may predict all other block units in the image frame and reconstruct the coded block units back for predicting the video.

The disclosed implementations are to be considered in all respects as illustrative and not restrictive. It should also be understood that the present disclosure is not limited to the particular implementations described above but that many rearrangements, modifications, and substitutions are possible without departing from the scope of the present disclosure.

What is claimed is:

1. A method of encoding video data by an electronic device, the method comprising:
   receiving an image frame of the video data;
   determining a block unit from the received image frame;
   determining a split line of the block unit;
   receiving first motion information and second motion information from a candidate list to reconstruct the block unit, wherein the first motion information includes a first list flag for selecting a first reference frame and the second motion information includes a second list flag for selecting a second reference frame;
   determining a sub-block in the block unit;
   determining whether the sub-block is included in a specific one of a plurality of block regions separated based on the split line, wherein the specific one of the plurality of block regions covers the split line;
   comparing the first list flag with the second list flag when the sub-block is included in the specific one of the plurality of block regions;
   storing a predefined one of the first motion information and the second motion information as stored motion information for the sub-block without checking whether the first reference frame and the second reference frame are included in a specific one of a plurality of reference lists indicated by a specific one of a plurality of flag values different from the first list flag and the second list flag when the first list flag is identical to the second list flag and the sub-block is included in the specific one of the plurality of block regions;
   storing the first motion information and the second motion information together as the stored motion information for the sub-block when the first list flag is different from the second list flag and the sub-block is included in the specific one of the plurality of block regions; and
   reconstructing, based on the stored motion information, a following block that is reconstructed after reconstructing the block unit.

2. The method according to claim 1, further comprising:
   storing the first motion information as the stored motion information for the sub-block when the sub-block is included in a first one of the plurality of block regions corresponding to the first motion information; and
   storing the second motion information as the stored motion information for the sub-block when the sub-block is included in a second one of the plurality of block regions corresponding to the second motion information, wherein each of the first one of the plurality of block regions and the second one of the plurality of block regions is different from the specific one of the plurality of block regions.

3. The method according to claim 1, wherein the predefined one of the first motion information and the second motion information is the second motion information.

4. The method according to claim 1, wherein:
   the specific one of the plurality of reference lists indicated by the specific one of the plurality of flag values is different from another one of the plurality of reference lists indicated by the first list flag when a number of the plurality of reference lists is equal to two and the first list flag is identical to the second list flag.

5. An electronic device for encoding video data, the electronic device comprising:
   at least one processor; and
   a storage device coupled to the at least one processor and storing one or more instructions which, when executed by the at least one processor, cause the electronic device to:
   receive an image frame of the video data;
   determine a block unit from the received image frame;
   determine a split line of the block unit;
   receive first motion information and second motion information from a candidate list to reconstruct the block unit, wherein the first motion information includes a first list flag for selecting a first reference frame and the second motion information includes a second list flag for selecting a second reference frame;
   determine a sub-block in the block unit;
   determine whether the sub-block is included in a specific one of a plurality of block regions separated based on the split line, wherein the specific one of the plurality of block regions covers the split line;
   compare the first list flag with the second list flag when the sub-block is included in the specific one of the plurality of block regions;
   store a predefined one of the first motion information and the second motion information as stored motion information for the sub-block without checking whether the first reference frame and the second reference frame are included in a specific one of a plurality of reference lists indicated by a specific one of a plurality of flag values different from the first list flag and the second list flag when the first list flag is identical to the second list flag and the sub-block is included in the specific one of the plurality of block regions;
   store the first motion information and the second motion information together as the stored motion information for the sub-block when the first list flag is different from the second list flag and the sub-block is included in the specific one of the plurality of block regions; and
   reconstruct, based on the stored motion information, a following block that is reconstructed after reconstructing the block unit.

6. The electronic device according to claim 5, wherein the one or more instructions, when executed by the at least one processor, further cause the electronic device to:
   store the first motion information as the stored motion information for the sub-block when the sub-block is included in a first one of the plurality of block regions corresponding to the first motion information; and
   store the second motion information as the stored motion information for the sub-block when the sub-block is included in a second one of the plurality of block regions corresponding to the second motion information, wherein each of the first one of the plurality of block regions and the second one of the plurality of block regions is different from the specific one of the plurality of block regions.

7. The electronic device according to claim 5, wherein the predefined one of the first motion information and the second motion information is the second motion information.

8. A method of encoding video data by an electronic device, the method comprising:
   receiving an image frame of the video data;
   determining a block unit from the received image frame;
   determining a split line of the block unit;

receiving first motion information and second motion information from a candidate list to reconstruct the block unit, wherein the first motion information includes a first list flag and the second motion information includes a second list flag;

determining a sub-block in the block unit;

determining whether the sub-block is included in a specific one of a plurality of block regions separated based on the split line, wherein the specific one of the plurality of block regions covers the split line;

determining, based only on a comparison between the first list flag and the second list flag, whether the first motion information and the second motion information are stored together as stored motion information for the sub-block when the sub-block is included in the specific one of the plurality of block regions;

storing the first motion information and the second motion information together as the stored motion information for the sub-block when the first list flag is different from the second list flag; and reconstructing, based on the stored motion information, a following block that is reconstructed after reconstructing the block unit.

9. The method according to claim 8, further comprising:

storing the first motion information as the stored motion information for the sub-block when the sub-block is included in a first one of the plurality of block regions corresponding to the first motion information; and storing the second motion information as the stored motion information for the sub-block when the sub-block is included in a second one of the plurality of block regions corresponding to the second motion information, wherein each of the first one of the plurality of block regions and the second one of the plurality of block regions is different from the specific one of the plurality of block regions.

10. The method according to claim 8, further comprising:

storing the second motion information as the stored motion information for the sub-block when the first list flag is equal to the second list flag and the sub-block is included in the specific one of the plurality of block regions.

11. The method according to claim 8, wherein a predefined one of the first motion information and the second motion information is stored as the stored motion information for the sub-block without checking whether a first reference frame selected based on the first list flag and a second reference frame selected based on the second list flag are included in a specific one of a plurality of reference lists indicated by a specific one of a plurality of flag values different from the first list flag when the first list flag is equal to the second list flag.

* * * * *